United States Patent
Van Berkum (10) Patent No.: US 7,699,371 B2
(45) Date of Patent: Apr. 20, 2010

(54) PARCEL SHELF MOUNTING FOR A PARCEL SHELF AND VEHICLE WITH SUCH A PARCEL SHELF AND/OR MOUNTING

(75) Inventor: Wim Van Berkum, Ostercappeln (DE)

(73) Assignee: Wilhem Karmann GmbH, Osnabruck (DE)

( * ) Notice: Subject to any disclaimer, the term of this patent is extended or adjusted under 35 U.S.C. 154(b) by 680 days.

(21) Appl. No.: 10/581,647

(22) PCT Filed: Nov. 26, 2004

(86) PCT No.: PCT/DE2004/002635

§ 371 (c)(1),
(2), (4) Date: Apr. 9, 2007

(87) PCT Pub. No.: WO2005/056338

PCT Pub. Date: Jun. 23, 2005

(65) Prior Publication Data

US 2007/0273169 A1     Nov. 29, 2007

(30) Foreign Application Priority Data

Dec. 6, 2003   (DE)   ................................ 103 57 097

(51) Int. Cl.
    *B60R 13/02*   (2006.01)
(52) U.S. Cl. ................................. 296/24.44; 296/37.16
(58) Field of Classification Search .............. 296/24.44, 296/37.16, 203.04, 193.08, 37.8
    See application file for complete search history.

(56) References Cited

U.S. PATENT DOCUMENTS

| | | | | |
|---|---|---|---|---|
| 4,479,675 A | * | 10/1984 | Zankl | 296/37.16 |
| 5,037,154 A | * | 8/1991 | Senba et al. | 296/37.16 |
| 6,808,228 B1 | * | 10/2004 | Campbell et al. | 296/193.02 |
| 6,983,971 B2 | * | 1/2006 | Broadhead et al. | 296/24.44 |
| 7,093,885 B2 | * | 8/2006 | Guillez et al. | 296/107.08 |
| 7,419,200 B2 | * | 9/2008 | Queveau et al. | 296/24.44 |
| 7,481,477 B2 | * | 1/2009 | Yang | 296/37.16 |

FOREIGN PATENT DOCUMENTS

| | | | |
|---|---|---|---|
| DE | 32 03 940 | 8/1983 | |
| DE | 4013158 | * 4/1990 | 296/37.16 |
| EP | 0 090 921 | 10/1983 | |
| JP | 405139213 | * 11/1991 | 296/37.16 |
| JP | 2000 255322 | 9/2000 | |
| JP | 2003 025918 | 1/2003 | |

* cited by examiner

*Primary Examiner*—Glenn Dayoan
*Assistant Examiner*—Gregory Blankenship
(74) *Attorney, Agent, or Firm*—Drinker Biddle & Reath LLP (57) ABSTRACT

A movable rear parcel shelf having a storage plate for use in a vehicle, which is able to be retained by means of a detent connection, and the detent connection itself are specified, whereby the detent connection is releasable by means of an actuating element which is associated with the storage plate, and whereby the detent connection occurs between a detent spring, which is connected to a part being secured to the vehicle, and a detent element, which is connected to the storage surface.

16 Claims, 7 Drawing Sheets

PARCEL SHELF MOUNTING FOR A PARCEL SHELF AND VEHICLE WITH SUCH A PARCEL SHELF AND/OR MOUNTING

This Application is the U.S. National Phase Application of International Application No PCT/DE2004/002635 filed Aug. 26, 2004.

The invention relates to a movable rear parcel shelf having a fixing device for retaining it in a secure manner. The rear parcel shelf is movable, i.e., in particular, detachable. The invention further relates to a device for holding such a rear parcel shelf, i.e. the fixing device itself. Lastly, the invention also relates to a vehicle, namely a motor vehicle, in particular, a passenger motor vehicle, i.e., for example, a cabriolet vehicle having such a rear parcel shelf or having a rear parcel shelf which can be retained by such a fixing device.

DESCRIPTION OF THE RELATED ART

A passenger motor vehicle having a pivotable storage plate is known from DE 699 03 212 T2. The storage plate is pivotable between a first position, in which it is situated between a front edge of the boot lid and a wall bordering the front area of the boot, and a second position, in which it is situated under the boot lid. The storage plate is connected with the boot lid such that it follows the opening and closing movement of the boot lid.

A device for demountably holding covering elements onto motor vehicles is known from DE 198 04 220 A1. The covering element is, in this case, held in a frame and formed so as to be collapsible towards an outer side.

A cover for a rear loading space of a cabriolet vehicle is known from DE 43 28 886 C2, which includes a shutter arrangement and a fold-away partition wall. In order to seal the boot, the shutter arrangement and the partition wall are adjusted towards one another such that an upper edge of the partition wall is flush with the shutter arrangement.

Special fixing devices or retaining devices for the covers are not mentioned in the cited documents.

BRIEF SUMMARY OF THE INVENTION

The invention consists in the specification of a fixing device, which is particularly suitable, in a motor vehicle, for use in the retention of movable storage surfaces, i.e., for example, storage plates as they are used in the case of a rear parcel shelf, and the like, and a storage surface provided with the fixing device, i.e., for example, the rear parcel shelf itself.

This problem is solved, in respect of the storage surface, according to the invention, through the features of Claim 1. To this end, in the case of a movable storage surface, i.e., in particular in the case of the rear parcel shelf, for use in a motor vehicle, having a fixing device for its retention and having an in particular one-piece, storage plate which forms the storage surface, whereby the fixing device includes an actuating element envisaged for releasing the retention, in particular a push button, it is envisaged that the actuating element includes a releasing device envisaged for releasing a detent connection retaining the storage surface, and that the detent connection occurs between a detent spring which is connected to a part being secured to the vehicle, and a detent element which is connected to the storage surface. In this case, the releasing device is formed and envisaged for penetrating into and expanding a clearance between the detent spring and the detent element when the detent connection is released.

With regard to the fixing device itself, this problem is solved according to the invention by the features of Claim 9. To this end, in a fixing device for retaining a movable storage surface, i.e., in particular, the rear parcel shelf, in a motor vehicle, which includes an actuating element envisaged for releasing the retention, in particular, a push button, it is envisaged that the actuating element includes a releasing device which is envisaged for releasing a detent connection retaining the storage surface, and that the detent connection occurs between a detent spring which is connected to a part being secured to the vehicle, and a detent element which is connected to the storage surface. Here also, the releasing device is formed and envisaged for penetrating into and expanding a clearance between the detent spring and the detent element when the detent connection is released.

A locking device for a flap, for example in the form of a glove compartment lid, is known from DE 196 12 066. In this case, the glove compartment lid is held in the closed position by means of a leg spring and a locking element. A gripping part is envisaged for opening the flap, which gripping part actuates the locking element by means of a pivot part such that the locking between the locking element and the leg spring is released by the locking element and the leg spring being separated from one another. Penetration of an actuating element into the clearance between the two elements forming the detent connection is not shown.

The advantage of the invention lies in the fact that the storage surface or rear parcel shelf can be released easily and by hand. The rear parcel shelf is movable after the retention has been released, such that detaching or pivoting of the rear parcel shelf is made possible. This is conveniently in order to make the loading space available under the rear parcel shelf accessible. The fixing device, as well as being suitable for retaining storage surfaces, i.e. horizontal or at least substantially horizontal surfaces, is also suitable for retaining vertical or at least substantially vertical surfaces, for example paneling elements. In order to prevent the paneling element from falling off in the case that the retention is released, it is beneficial if the panelling element is designed in a pivotable manner, i.e. is still fixed to an axle or the like, even after the releasing of the retention, or if the panelling element is fixed by at least one additional hook or the like. For this aspect of the invention, the terms "storage surface" and "storage plate", which are used continuously in the following, should be understood to include panelling surfaces and panelling plates respectively.

Advantageous embodiments of the invention are the subject of the subclaims, which are based on the respective independent claims.

If a recessed grip lower part is arranged at the lower side of the storage plate, this forms, together with the storage plate, a recessed grip, which is accessible when the actuating element is actuated. A defined portion is thus obtained, with which the user's hand can engage in order to move or detach the storage plate.

Preferably, the releasing device is a component, in particular a one-piece component, of a push button lower part which belongs to the actuating element and which includes a guide element. The guide element is, in turn, fixed in a guide contour associated with the storage plate, and in particular, connected with this in a one-piece manner. The push button is thereby fixed particularly in a particularly simple manner to the storage plate. The mounting of the push button is simplified in that this must substantially only be inserted into the guide contour with its guide element. Nonetheless, a secure fixing of the push button is ensured as a result of the form of the guide contour and as a result of the form-fitting engagement of the guide element with the guide contour.

If the guide contour has a limiting pin, which engages with a recess of the guide element, the path around which the guide element can move into the guide contour when the push button is actuated and can move out of the guide contour when the push button is not actuated, is limited in a simple manner. Through a suitable selection of both the position of the limiting pin and the dimensions of the corresponding recess, an undesired dropping of the push button out of the storage plate can be prevented.

If the guide contour has an extension, on which a spring element, for example a push button spring designed as a spiral spring, is arranged, which, when under tension, abuts a lower side of the push button, in particular which abuts the push button lower part, the spring element holds the push button in a defined position in the non-actuated state. Further, the spring force of the spring element must be overcome when the push button is actuated, such that an unforeseen releasing of the retention is largely prevented.

The releasing device is advantageously designed as a wedge which is slanted at the free end, whereby the releasing device is situated under the push button perpendicular to a plane defined by the storage plate. The wedge ensures that the detent connection can be released particularly easily, because the wedge can co-operate with a correspondingly bent tongue of the detent spring. There thus occurs a transmission of the force to the detent spring over the largest possible surface. An effective transmission of force is also ensured in a beneficial manner, if the releasing device extends, in a perpendicular manner, under the push button.

Preferably, the releasing device is centrically slit at the free end. Then a detent cam provided at the detent spring can enter the slit at the releasing device. That is, the push button can be fully actuated, such that the recessed grip is fully accessible as a space for the hand, without the path of the push button being limited by the detent cam, which approximately abuts the lower edge of the releasing device.

Further preferably, the detent element, with which the detent cam engages, tapers off to a wedge shape at the free end, i.e. in the form of a ramp. This is sensible, in order that the detent connection closes as easily as possible when the storage plate is introduced or re-attached. The ramp, in this case, firstly pushes the detent cam to the side, such that the detent spring is made to travel. When pushing on the storage surface occurs, the detent cam slides ever higher at the ramp and the detent spring is made to travel correspondingly further. The detent connection is closed if the detent cam, after the end of the ramp, engages with a recess which is envisaged for it at the detent element.

In the following, an embodiment of the invention will be described in greater detail using the drawings. Corresponding objects or elements are provided with the same reference numbers in all figures.

BRIEF DESCRIPTION OF THE DRAWINGS

The following are shown.

DETAILED DESCRIPTION OF THE INVENTION

Figure 1:
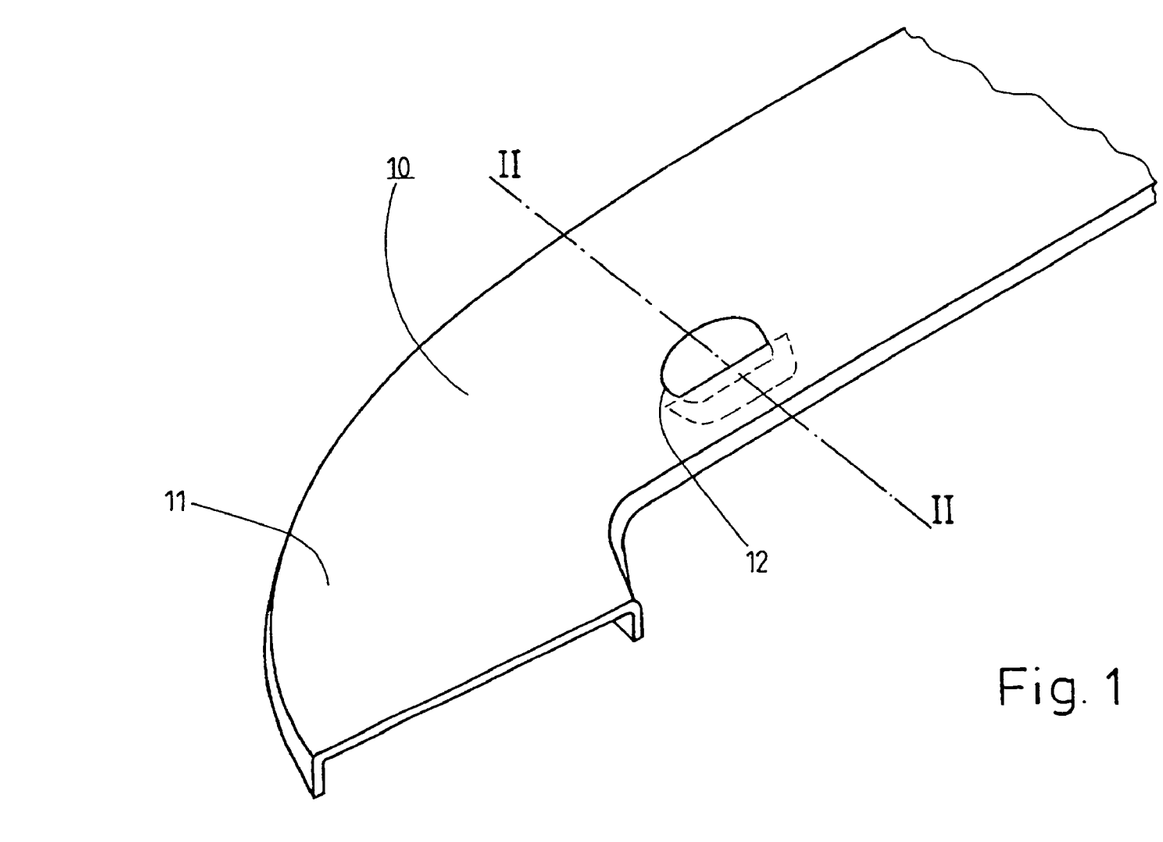
FIG. 1 a schematically simplified perspective depiction of a rear parcel shelf.

FIG. 1 shows a schematically simplified perspective depiction of a rear parcel shelf 10, as an example of a movable storage surface. The rear parcel shelf 10 includes a storage plate 11 and at least one push button 12 for releasing a retention holding the rear parcel shelf 10.

Figure 2:
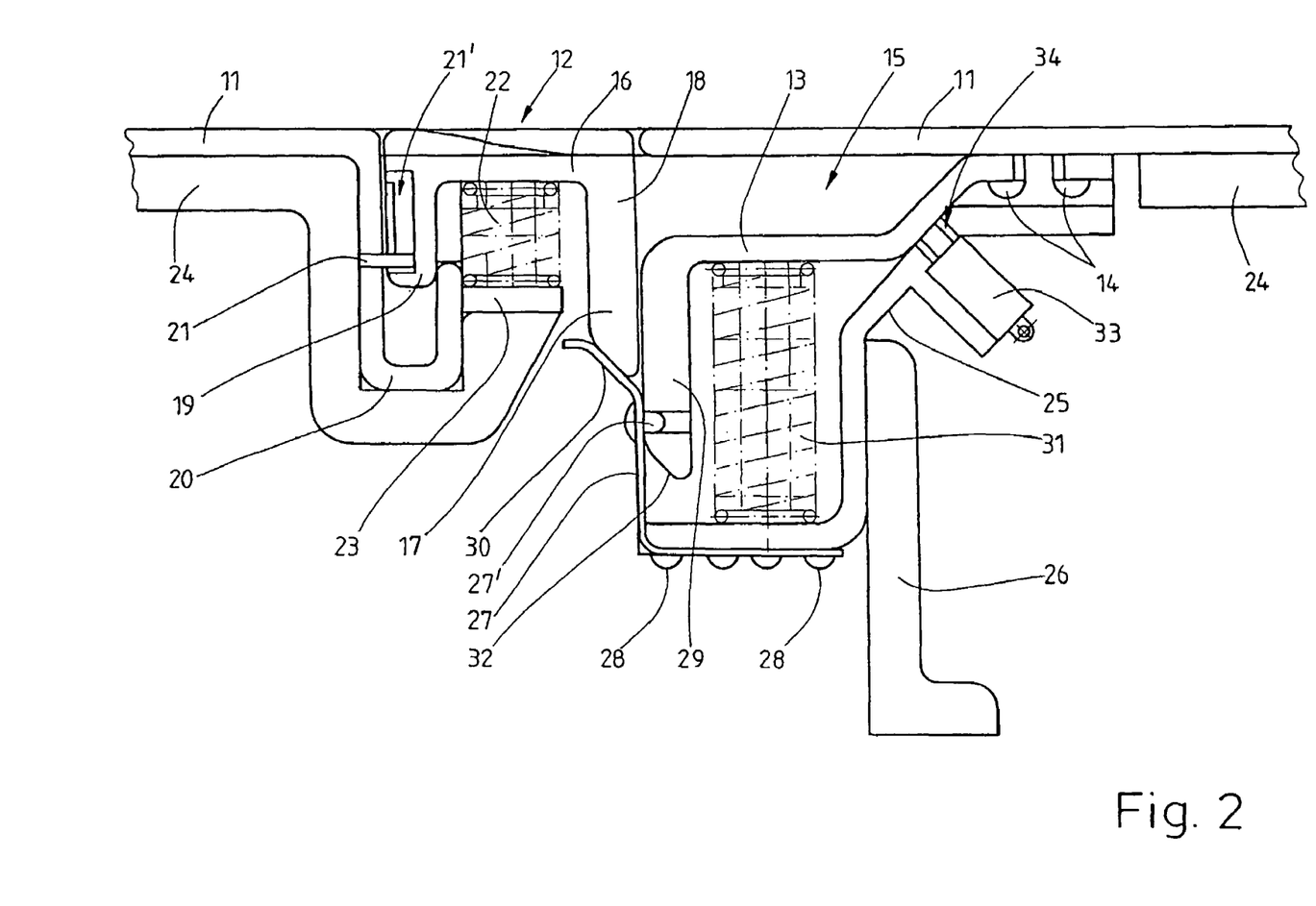
FIG. 2 a vertical section through the rear parcel shelf in the area of a fixing device provided for retaining it, FIG. 3 a schematically simplified perspective depiction of a receiving element for receiving the rear parcel shelf, FIG. 4 a schematically simplified perspective depiction of a detent element in a vertical section, FIG. 5 a schematically simplified perspective depiction of a push button for releasing the retention of the rear parcel shelf, also in a vertical section, FIG. 6 a schematically simplified perspective depiction of a storage surface forming the rear parcel shelf, having a guide contour for receiving the push button, also in a partially completed vertical section and FIG. 7 a detent spring, which, together with the detent element, forms the detent connection for retaining the rear parcel shelf.

FIG. 2 shows, in order to describe in more detail the retention of the rear parcel shelf 10, a section through this along the line II-II in FIG. 1. In the depiction, it can be seen that the rear parcel shelf 10 further includes a recessed grip lower part 13 alongside the storage plate 11 and the push button 12. The latter is welded to the storage plate 11. To this end, a storage plate weld connection 14 is depicted, which, in the form of liquefied material of the storage plate 11, engages with a recess in the recessed grip lower part 13 envisaged for this purpose. The recessed grip lower part 13 is shaped such that it forms, with the storage plate 11, a recessed grip 15 in the area of the push button 12.

The push button 12, in turn, includes a push button lower part 16 having a releasing device 18 ending in a wedge 17, and a guide element 19. The latter is guided by a guide contour 20 formed in the storage plate 11. The guide contour 20 appears in the sectional depiction as a pot, which the guide element 19, which appears as a peg, engages with in a form-fitting manner. The push button 12 is depicted in a non-actuated position. The guide element 19 is correspondingly situated at the upper end of the guide contour 20. When the push button 12 is actuated, the guide element 19 penetrates further into the guide contour 20. The depth of the guide contour 20 limits the path of the push button 12 when actuation takes place. In order to hold the non-actuated push button 12 in the guide contour 20, a limiting pin 21 is envisaged, which is arranged in the storage plate 11 in the area of the guide contour 20 and which engages, with a protruding end, with a recess 21' provided for it at the push button lower part 16, in particular at the guide element 19 of the push button lower part 16. The limiting pin 21 limits the path of the non-actuated push button 12 and holds the guide element 19 in the guide contour 20 at least insofar that a secure fixing of the push button 12, especially in the non-actuated state, is ensured. When actuation takes place, the push button 12 is pushed down against the pressure of a spring element, for example a push button spring 22 which is designed as a spiral spring. This is situated between a support formed by an extension 23 of the guide contour 20, and the lower side of the push button lower side 16. The push button spring 22 is, in this case, pre-tensioned, such that it lifts the push button lower part 16 into a position determined by the limiting pin. The surface of the push button 12 is flush with the surface of the storage plate 11 in this position.

The storage plate 11 has several reinforcing ribs 24 which run parallel or at least substantially parallel to the longest axis of the storage plate 11 and which appear in the sectional depiction in FIG. 1 as solid elements. One or individual reinforcing ribs 24 are formed in the area of the push button 12 such that they follow the outer contour of the guide contour 20. The or each of the reinforcing ribs 24 concerned thereby supports the guide contour 20 and prevents possible undesired deformation of it when actuation of the push button 12 takes place.

In the area of the recessed grip lower part 13, a receiving element 25 is arranged as an element which is secured to the vehicle. The situation is depicted whereby the receiving element 25 is designed as a separate component and is attached to a fastening holder 26, which is likewise secured to the vehicle.

The receiving element 25 is formed suitably in order for there to be a suitable contour for the adjustment of the rear parcel shelf 10 in a correct positional manner. The recessed grip lower part 13 abuts this contour, at least in portions.

A detent spring 27 with a detent cam 27' is attached to the receiving element 25, for example by welding, as can be seen from the depicted weld domes 28. The detent cam 27' engages, when a detent connection exists, in an opening provided for this purpose at an extension of the recessed grip lower part 13, designed as a detent element 29. At the free end of the detent spring 27, this runs above the detent cam 27' in the form of a bent tongue 30. The angle of the tongue 30 corresponds substantially to the gradient of the wedge 17 at the end of the releasing device 18.

In the depicted position, the rear parcel shelf 10 is retained, because the detent cam 27' engaging with the detent element 20 prevents a raising or an undesired releasing of the rear parcel shelf 10. In order to release the rear parcel shelf 10, the push button 12 is actuated and is, to this end, pushed down against the pressure of the detent spring 22. In this case, the guide element 19, on the one hand, penetrates into the guide contour 20. On the other hand, the wedge 17 pushes, at the end of the releasing device 18, on the tongue 30 at the end of the detent spring 27. When further actuation of the push button 12 takes place, the wedge 17 makes the detent spring 27 travel, such that the detent cam 27' is finally lifted from the detent element 29. The depth of the guide contour 20 and the dimensions of the recess 21' are, for this purpose, dimensioned such that the wedge 17 can make the detent spring 27 travel to such an extent that the detent connection is released. The releasing device 18 is thus formed and envisaged for penetrating into and expanding a clearance between the detent spring 27 and the detent element 29 when the detent connection is released. This clearance exists, firstly, substantially in the area of the tongue 30. When the clearance is expanded, i.e. when the detent spring 30 is made to travel, the releasing device 18 or the wedge 17, at its end, enlarges the clearance little by little to such an extent that the detent cam 27' is finally lifted from the detent element 29. Elements of the detent connection are correspondingly the detent spring 27 with the detent cam 27', the detent element 29, with which the detent cam 27' engages when a detent connection exists, and the wedge 17 at the end of the releasing device 18 for releasing the detent connection.

As soon as the detent element 29 is free, the rear parcel shelf 10 is raised up by a spring element, for example a lifting spring 31 designed as a spiral spring, which is situated between the receiving element 25 and the recessed grip lower part 13 under pretensioning. The spring force of the lifting spring 31 is, for this purpose, dimensioned such that at least a raising up of the rear parcel shelf 10 is possible. This also prevents an undesired renewed catching of the detent connection. In the raised up state of the rear parcel shelf, which is not depicted, the recessed grip 15 becomes accessible. That is, an operator can grasp the recessed grip 15 with the same hand with which he/she previously actuated the push button 12, in order to further raise up the rear parcel shelf by means of pressure against the lower side of the storage surface 11 in the area of the recessed grip 15. For a pivotably movable rear parcel shelf 10 (not shown), consideration should be given to a support surface contour enabling a pivoting movement, in particular in the area of the push button 12, and to sufficient gaps between pivoted and stationary elements, for example the detent element 29 and the lifting spring 31.

Upon retention of the rear parcel shelf 10, this is firstly adjusted in the envisaged position. Here, the counter-contour of the support surface 24, adapted to the outer contour of the guide contour 20, and a diagonal portion of the recessed grip lower part 13, which abuts a corresponding portion of the receiving element 25, are helpful. The spring force of the lifting spring 31 is overcome by light pressure on the upper side of the storage plate 11, such that the detent cam 27' of the detent spring 27 slides along at the ramp 32 formed at the end of the detent element 29 and the detent spring 27 is made to travel. As soon as the envisaged position of the rear parcel shelf 10 has been reached, the detent cam 27' engages with the detent element 29, such that the rear parcel shelf is retained once again. The detent connection prevents vertical mobility of the rear parcel shelf 10. Horizontal mobility of the rear parcel shelf 10 is prevented by the contours already described above in conjunction with the pre-adjustment of the rear parcel shelf 10 upon introduction.

In order to check that the rear parcel shelf 10 is retained correctly, a microswitch 33 is envisaged. This is attached to the receiving element 25 and engages, by means of a probe head, through an opening 34 provided for this purpose, with the receiving element 25. The opening 34 is situated in a portion of the receiving element 25, which is abutted by a portion of the recessed grip lower part 13, when the rear parcel shelf 10 is retained. The concerned portion of the recessed grip lower part 13 actuates the microswitch 33 such that an electrical signal can be discharged in a manner which is known per se and which is thus not depicted and also not described in a more detailed fashion, which electrical signal indicates the correct retention of the rear parcel shelf. As soon as the detent connection is released, the rear parcel shelf 10 is raised up by the lifting spring 31 at least insofar that the recessed grip 15 is accessible and the microswitch 33 is also freed in the process. From this switching situation of the microswitch 33, an electrical signal can be discharged, which indicates the released retention of the rear parcel shelf.

Figure 3:
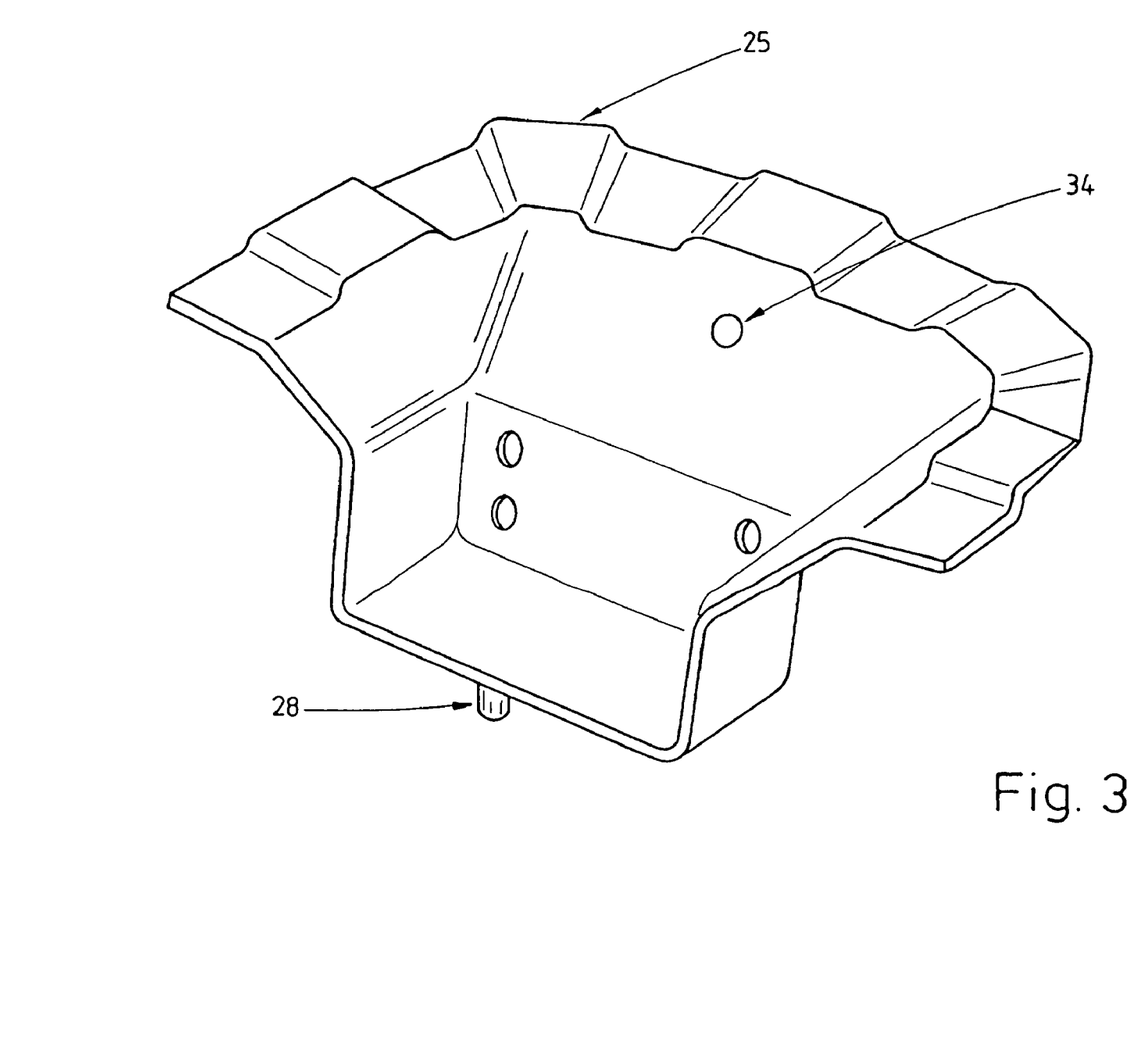

FIG. 3 shows, also in a schematically simplified perspective depiction, the receiving element 25, which is provided for receiving the rear parcel shelf in the area of the recessed grip 15. In the depiction, the opening 34 for the microswitch 33 can be recognised, along with one of the weld domes 28, with which the detent spring 27 is connected to the receiving element 25.

Figure 4:
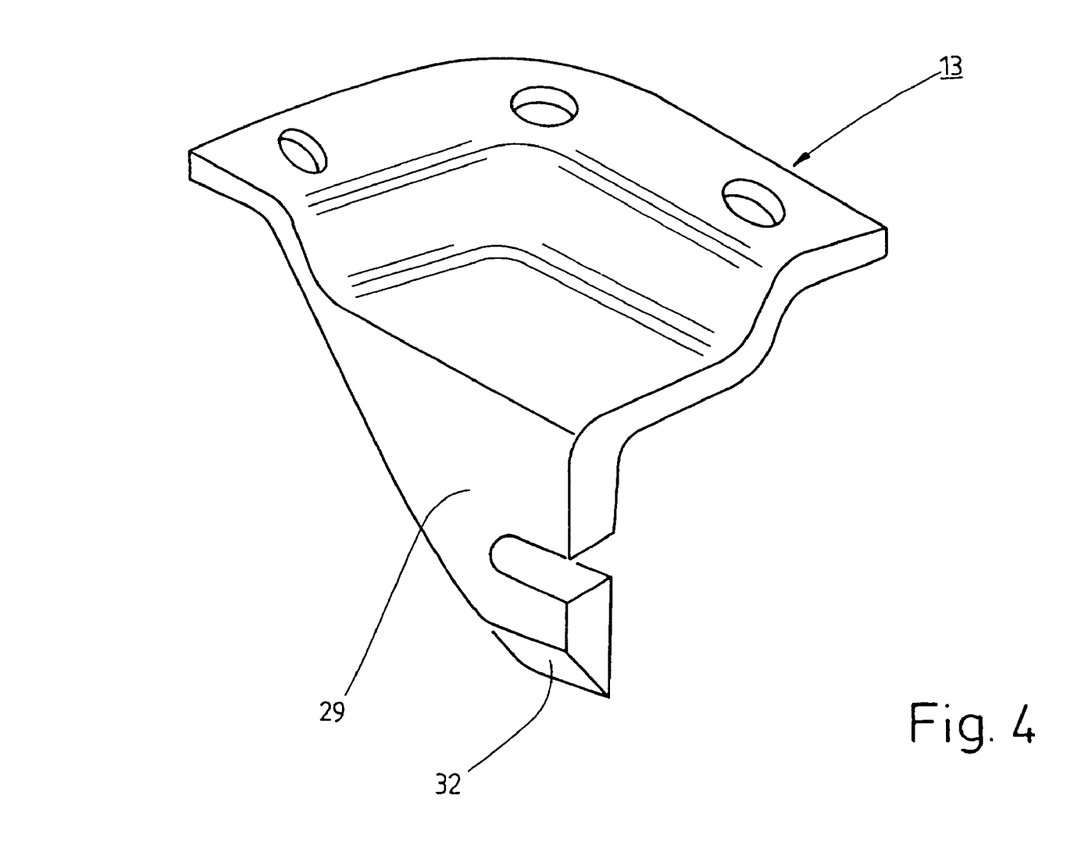

FIG. 4 shows, in a schematically simplified perspective depiction, the detent element 29 in a vertical section. A free leg of the detent element 29, which extends downwardly in a perpendicular manner and which tapers off at its free end in a slanting manner and thus forms the ramp 32, can be recognised. Approximately in the middle area of the leg, a detent area, designed as a horizontally orientated longitudinal hole, is depicted, with which the detent cam 27' of the detent spring 27 engages. Due to the vertical section, only half of the detent element 29 is visible.

Figure 5:
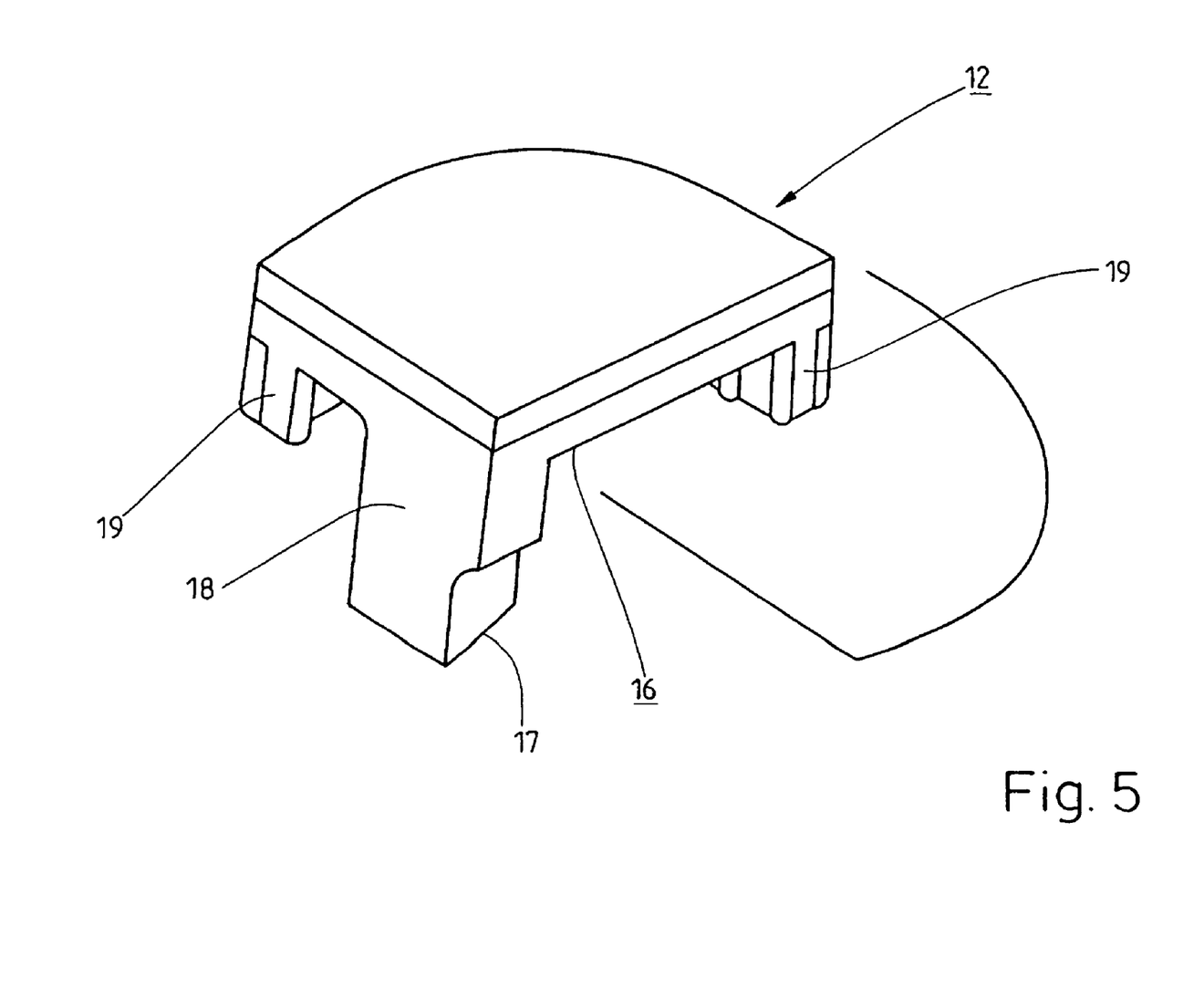

FIG. 5 shows, in a schematically simplified perspective depiction, the push button 12 for releasing the retention of the rear parcel shelf, also in a vertical section. It can be recognised that the push button 12 has an outer contour in the form of a semi-circle on one side. On this side of the push button 12, at the lower side of the push button 12, along the complete semi-circle line, where applicable, interrupted in sections, runs the guide contour 19. This form of the guide contour 19 enables a fixing of the push button 12 in the direction of all of the spatial co-ordinates. The other side of the push button 12 is designed in a straight manner. At this side, the releasing device 18 extends in a perpendicular manner under the push button 12, which releasing device is slanted at its free end and thus has the wedge 17. In the vertical section, which shows exactly half of the push button 12, it can additionally be recognised that the releasing device 18 is centrically slit at the free end. The detent cam 27' can engage with this slit when the retention is released, such that the path of the releasing device 18 is not limited by the detent cam 27'.

Figure 6:
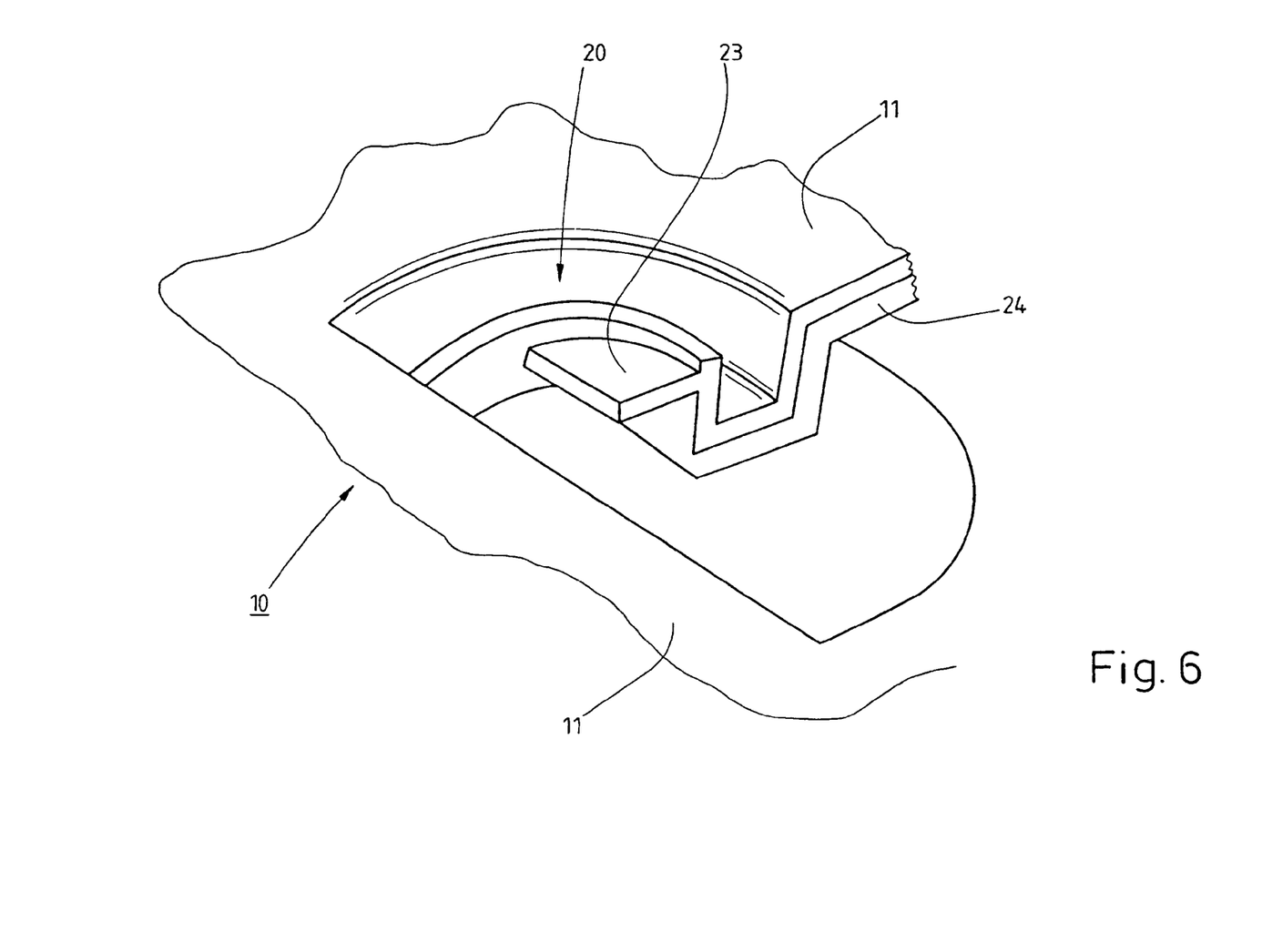

FIG. 6 shows a schematically simplified perspective depiction of the storage surface 11 forming the rear parcel shelf, with the guide contour 20 for receiving the push button 12, also in a partially realised vertical section. It can be recognised that the guide contour 20, corresponding to the corresponding form of the guide element 19 of the push button 12, is designed in the form of a semi-circle. Thus, as already mentioned, a fixing of the push button 12 in the direction of all of the spatial co-ordinates is ensured. On the one hand—if the x-y plane is conceived to be coplanar with the largest surface of the storage plate 11—a displacement of the push button 12 in the x or y direction is prevented. On the other hand, an undesired tilting of the push button 12 and thus an undesired mobility in the z direction, is prevented.

Also depicted is the extension 23, which bears the push button spring 22 when the push button 12 is mounted.

Figure 7:
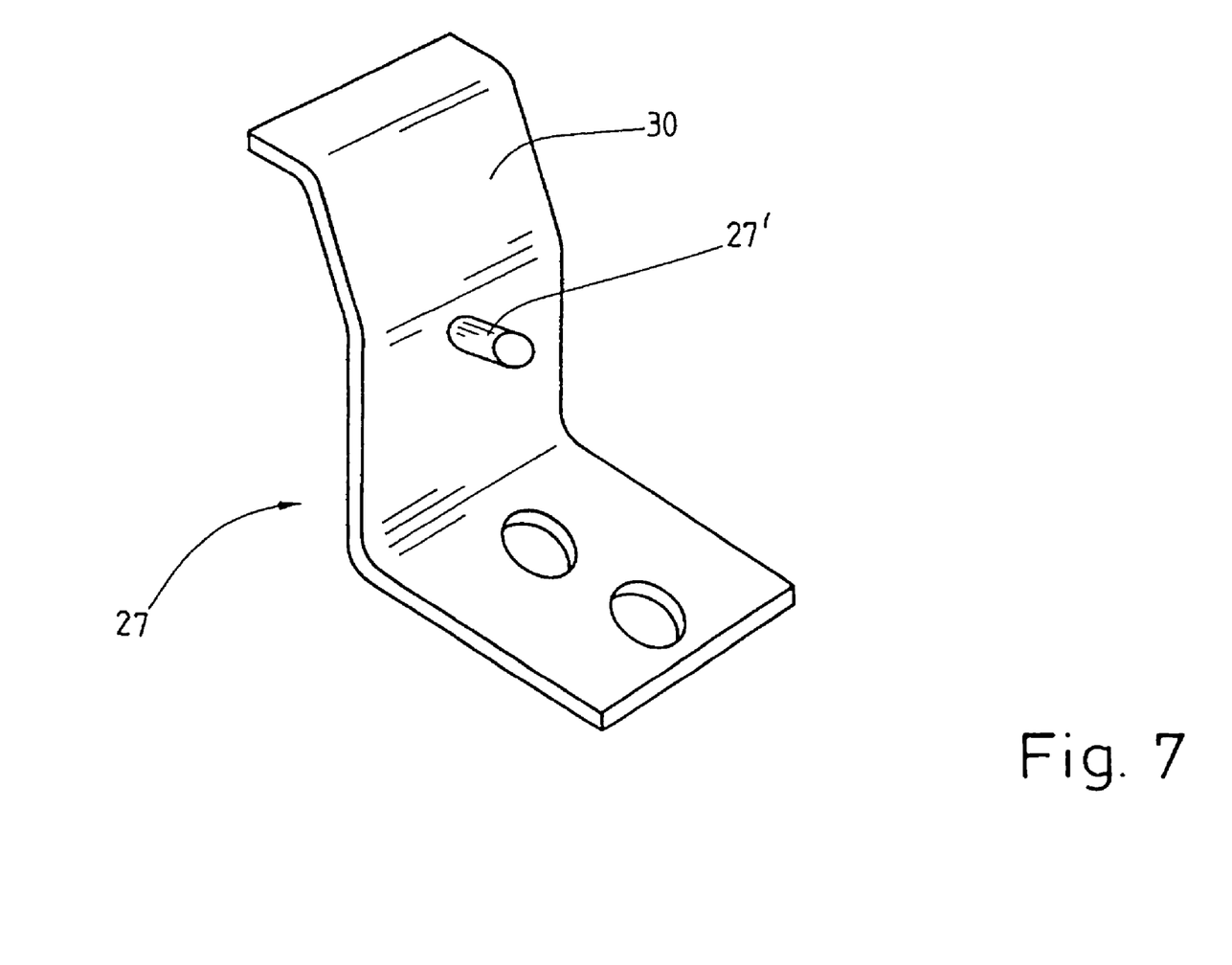

Finally, FIG. 7 shows the detent spring 27 with the detent cam 27'. At the free end of the detent spring 27, the bent tongue 30 (c.f. FIG. 2) can be recognised, which is actuated in order to release the retention at the releasing device 18. At the end of the detent spring 27 which is securely located in the mounted state, two bores can be recognised, with which the weld domes 28 of the receiving element 25 for connecting the detent spring 27 with the receiving element 25 engage.

List of Reference Numbers

10 Rear parcel shelf
11 Storage plate
12 Push button
13 Recessed grip lower part
14 Storage plate weld connection
15 Recessed grip
16 Push button lower part
17 Wedge
18 Releasing device
19 Guide element
20 Guide contour
21 Limiting pin
21' Recess
22 Push button spring
23 Extension
24 Reinforcing rib
25 Receiving element
26 Fastening holder
27 Detent spring
27' Detent cam
28 Weld dome
29 Detent element
30 Tongue
31 Lifting spring
32 Ramp
33 Microswitch
34 Opening

The invention claimed is:

1. A rear parcel shelf for use in a motor vehicle, having a fixing device for its retention and having a storage plate forming the storage surface, whereby the fixing device includes an actuating element envisaged for releasing the retention, whereby a detent connection, which retains the storage surface, occurs between a detent spring which is connected to a part being secured to the vehicle, and a detent element which is connected to the storage surface, whereby the actuating element includes a releasing device which is envisaged for releasing the detent connection, whereby the releasing device is formed and envisaged for penetrating into and expanding a clearance between the detent spring and the detent element when the detent connection is released, whereby the releasing device is a component of a push button lower part which belongs to the actuating element and which includes a guide element, which is fixed in a guide contour associated with the storage plate, and whereby the guide contour has a limiting pin, which engages with a recess of the guide element.

2. The rear parcel shelf according to claim 1,
having a recessed grip lower part arranged at the lower side of storage plate, which forms, together with the storage plate, a recessed grip, which is accessible when the actuating element is actuated.

3. The rear parcel shelf according to claim 1
whereby the guide contour has an extension, on which a spring element is arranged, which, when under tension, abuts a lower side of the actuating element.

4. The rear parcel shelf according to claim 1,
whereby the releasing device is designed as a wedge which is slanted at the free end, and whereby the releasing device is situated under the push button perpendicular to a plane defined by the storage plate.

5. The rear parcel shelf according to claim 4,
whereby the releasing device is centrically slit at the free end.

6. The rear parcel shelf according to claim 1,
whereby the detent spring has a detent cam envisaged for engaging with a recess at the detent element, and whereby the detent element tapers off at the free end in the form of a ramp.

7. A fixing device for retaining a rear parcel shelf having a storage plate forming a storage surface in a motor vehicle, having an actuating element envisaged for releasing the retention, whereby the actuating element includes a releasing device which is envisaged for releasing a detent connection which retains the rear parcel shelf, whereby the detent connection occurs between a detent spring, which is connected to a part being secured to the vehicle, and a detent element which is connected to the storage surface, whereby the releasing device is formed and envisaged for penetrating into and expanding a clearance between the detent spring and the detent element when the detent connection is released, whereby the releasing device is a component of a push button lower part which belongs to the actuating element, and which includes a guide element, which is fixed in a guide contour associated with the storage plate, and whereby the guide contour has a limiting pin, which engages with a recess of the guide element.

8. The fixing device according to claim 7, having a recessed grip lower part arranged on the lower side of the storage plate, which forms, together with the storage plate, a recessed grip, which is accessible when the actuating element is actuated.

9. The fixing device according to claim 7 whereby the guide contour has an extension, on which a spring element is arranged, which, when under tension, abuts a lower side of the actuating element.

10. The fixing device according to claim 7, whereby the releasing device is designed as a wedge which is slanted at the free end, and whereby the releasing device is situated under the push button perpendicular to a plane defined by the storage plate.

11. The fixing device according to claim 10, whereby the releasing device is centrically slit at the free end.

12. The fixing device according to claim 7, whereby the detent spring has a detent cam envisaged for engaging with a recess at the detent element, and whereby the detent element tapers off at the free end in the form of a ramp.

13. A motor vehicle having a rear parcel shelf according to claim 1.

14. A motor vehicle having a fixing device according to claim 7.

15. The motor vehicle according to claim 13, whereby, at a part which is secured to the vehicle a microswitch is arranged, which protrudes, with a probe head, through an opening of the receiving element, such that the microswitch is actuated when the storage plate rests on it.

16. The motor vehicle according to claim 15, whereby an electrical signal, based on a switching position of the microswitch, for triggering a display with regard to the correct positioning and/or retention of the storage surface or the storage plate, is envisaged.

* * * * *